125,670

UNITED STATES PATENT OFFICE.

WILLIAM A. FISCHER, OF ALLEGHENY, PENNSYLVANIA.

IMPROVEMENT IN PREPARING SURFACES OF GLASS ARTICLES.

Specification forming part of Letters Patent No. 125,670, dated April 16, 1872.

Be it known that I, WILLIAM ALBERT FISCHER, of Allegheny, Pennsylvania, have invented a new and useful Process for Preparing the Surfaces of Glass Articles, giving to them an opaque and ornamental finish; and I do hereby declare that the following is a full, clear, and exact description thereof.

The nature of my invention consists in coating the surfaces of glass articles with the chemical compound hereinafter described; then partially drying the coating, after which a portion of it is removed by means of suitable patterns and brush, and then subjecting the coated glass to a moderate heat, causing the chemical action, which renders the coated surfaces opaque.

I take one quart of concentrated sulphuric acid and about three quarts of soft or distilled water, and slowly add the sulphuric acid to the water, mixing them thoroughly. This mixture is allowed to stand for about one hour, or until it is perfectly cool. I then take one-eighth of an ounce of caustic potash, and dissolve it in just sufficient water to hold it in solution; to this solution I add a few drops of fluoric acid, and this latter mixture I add to the former, stirring them thoroughly together. I then take finely-pulverized fluor spar, and mixing a sufficient quantity of it with the above-mentioned compound, form a cream-like body, and with a suitable brush I coat the surface of the glass with this mixture, which is allowed to partially dry. I then cover the coated surface with a thin sheet of brass, provided with the desired figures or ornaments cut out of it—as in stencil-plate. I then with a suitable brush remove the exposed portions or parts of the coating. The plate is then removed, and the glass subjected to a uniform heat of about 110° Fahrenheit for about twenty minutes. It is then washed and dried (allowing the glass to cool off before washing.) After the coating has been washed off the glass with water it should be thoroughly dried by rubbing it with a cotton cloth or other material. The proportions of the ingredients hereinbefore named may be varied according to the degree of opaqueness desired in the part of the glass not ornamented with transparent figures.

The desired figures or ornamentations are cut out in thin sheets of brass or other metal, or suitably-prepared paper in the same manner as that practiced by stencil-cutters. The sheet provided with the ornamental openings, may cover the whole plate of glass, or only a portion of the plate. By treating glass articles, as hereinbefore described, window-glass, lamp-shades, and many other things made of glass may be highly and durably ornamented with great facility, and at comparatively little cost.

Having thus described the nature and operation of my discovery or process for making the surfaces of glass articles opaque, what I claim as being of my invention, is—

The process hereinbefore described, of preparing the surface or surfaces of glass articles, so that it or they shall have an opaque appearance, the same being accomplished through the medium of the chemical agents prepared, combined, and applied as set forth.

In witness whereof I hereunto set my hand this 16th day of February, 1872.

WM. A. FISCHER.

Witnesses:
ADAM CLARKE JOHNSTON,
JAMES J. JOHNSTON.